JOHN DONAVAN DENNIS, OF GILROY, CALIFORNIA.

Letters Patent No. 91,094, dated June 8, 1869.

IMPROVED COMPOSITION FOR DESTROYING ANTS.

The Schedule referred to in these Letters Patent and making part of the same.

*To all whom it may concern:*

Be it known that I, JOHN DONAVAN DENNIS, of Gilroy, Santa Clara county, California, have invented a new and useful Combination of Matter for the Perfect and Effectual Poisoning, Killing, and Banishing of Ants, preventing their harboring, dwelling, or remaining in or about houses, cupboards, and pantries, or any other places or articles whatsoever; and I do hereby declare that the following is a full and exact description thereof.

The nature of my invention consists in the use of a composition of matter, consisting of crystallized corrosive sublimate, pulverized red Cayenne pepper, and pulverized gum-camphor, mixed thoroughly, in the proportion of one and one-half ounce of crystallized corrosive sublimate, one and one-half drachm of pulverized red Cayenne pepper, and one drachm of pulverized gum-camphor, the said composition to be freely sprinkled around, about, and upon the ant-holes, or places of entrance to the houses, cupboards, and pantries, or any other places, or articles whatsoever.

To enable others skilled in the art to make and use my invention, I will proceed to describe its composition and use.

I pulverize the crystallized corrosive sublimate, then add the pulverized red Cayenne pepper, and mix them thoroughly.

Then I pulverize the gum-camphor separately, and then mix it with the other two ingredients by grinding them together, thoroughly, in a mortar or other common method of mixing.

Then I bottle, and cork tightly.

What I claim as my invention, and desire to secure by Letters Patent, is—

The use of the above-mentioned composition of crystallized corrosive sublimate, pulverized red Cayenne pepper, and pulverized gum-camphor, in about the above-mentioned proportions, for the purpose of perfectly and effectually poisoning, killing, and banishing ants, preventing their harboring, dwelling, or remaining in or about houses, cupboards, and pantries, or any other places or articles whatsoever.

JOHN DONAVAN DENNIS.

Witnesses:
CARLETON W. MILLER,
H. J. TILDEN.